Patented Nov. 26, 1940

2,223,269

UNITED STATES PATENT OFFICE 2,223,269

MILK PRODUCT

Raymond Powers, Syracuse, N. Y., assignor to The Borden Company, New York, N. Y., a corporatioin of New Jersey No Drawing. Application May 19, 1938,
Serial No. 208,808

5 Claims. (Cl. 99—90)

The invention relates to improvements in powdered milk and in the making of dough for baked food products.

There are two principal kinds of milk powder used in making bread and similar baked goods. One is known as roller milk powder, or "roller process" milk powder; the other as spray milk powder, or "spray process" milk powder. The two possess recognizably different characteristics although not differing greatly in chemical analysis except as the raw milk from which they are produced may vary. The solubility indices of the two are not the same, but ordinarily this property is not regarded as an important factor in the production of baked goods. The two kinds of powder are distinguished principally by the characteristics exhibited when one or the other is mixed with water and other ingredients in the making of dough for baking. Roller milk powder has a tendency to make the dough stiff during the first part of the mixing period but softer as mixing progresses until, near the end of the period, it becomes so soft that it is difficult to handle. This is especially true if sufficient water is added to the dough to overcome the stiffness at the beginning of the mixing period. A stiff dough is difficult to mix because it does not adhere well to the moving parts of the mixer, resulting in a less effective kneading. Spray milk powder has a tendency to make the dough stick to the sides and bottom of the mixer, which is objectionable. While it is not subject to the above noted disadvantages of roller milk powder, it is a more expensive product by reason of higher production costs.

It is an object of the present invention to provide an improved milk powder. I have discovered that by producing a blend of roller milk powder and spray milk powder, the disadvantages I have described are largely overcome. I have discovered also that such a blend possesses advantages from the standpoint of the "keeping" quality and improvement in crumb softness of bread produced therewith. The latter improvement I attribute to the fact that an increased amount of water can be absorbed by the mix without the use of additional quantities of solids. In this connection I have made the surprising discovery that the water absorptive power of powdered milk made of a blend of roller powder and spray powder in accordance with the present invention is actually greater than the average of the two weighted in accordance with the proportion of each present in the blend. The results of the blend, therefore, are not additive.

It is a further object of my invention to provide an improved method of making dough for bread and similar baked goods. I have found that when substantial proportions of roller milk powder and spray milk powder are added to a dough mix including flour and water, an increased absorption of water by the ingredients of the mix is obtained. I have found further that when such increased absorption of water is thus brought about, the dough is superior in certain respects to that which can be produced by other methods. Bread produced from such a dough is characterized by its softness of crumb, and is also considered to possess other qualities desirable to the baker.

In accordance with my invention, from about 20 to 30 per cent of roller milk powder is mixed with about 70 to 80 per cent of spray milk powder, the proportions being such that the blend is characterized by possessing higher water absorptive power than is possessed by either constituent thereof. The tests which I have performed indicate that markedly superior properties are obtained when the two constituents are combined in the proportions named.

Good quality pure roller milk powder, when used in making a bread dough, will absorb or take up a maximum of about 1.25 times its weight of water. Good quality spray milk powder, if properly made, will take up about the same amount of water. My experiments have shown, however, that when roller and spray process milk powders, each capable of absorbing 1.25 times its weight of water, are blended in the proportions disclosed above, the resulting mixture will absorb from about 1.35 to about 1.40 times its weight of water. Hence when powder blended in this manner is used in making a bread dough, there will be a substantial increase in the moisture content of the dough. The additional water in taken up by the dough without the necessity of increasing the quantity of solids in the dough.

I prefer to use about one part of roller milk powder to three parts of spray milk powder by weight. These two constituents may be mixed in the dry form by any suitable means known to the art. As a specific example of the application of my improved milk powder to the making of bread, I cite the following:

| | Parts |
|---|---|
| Flour | 100 |
| Water | 68.3 |
| Milk powder blend | 6 |
| Sugar | 5 |
| Salt | 2 |
| Lard | 4 |
| Yeast | 2 |

The mixing is performed in such a way as to bring about the absorption of the maximum amount of water. By combining the two kinds of milk powder in the proportions stated, sufficient water can be added at the beginning of the mixing period to avoid the initial stiffness brought about by the presence of the roller powder, and by the time mixing has progressed to the point where a dough comprising only the roller powder would normally become soft, the spray powder appears to have counteracted the softening tendency of the roller powder. During the process, more water is taken up by the dough than would be possible when either of the powders is used alone.

The precise reasons for the results I have described are not known to me, and I do not wish to be limited with respect to any of the statements made herein to explain the improvement in water absorptive power, or in the quality of baked goods made from dough in which my novel blend is employed. My observations have shown that the bread possesses excellent keeping qualities, and does not mould readily; also, that it is characterized by an improved softness of crumb as compared with bread made from dough of lower water content.

The terms and expressions which I have employed are used in a descriptive and not a limiting sense, and I have no intention of excluding such equivalents of the invention described, or of portions thereof, as fall within the purview of the claims.

I claim:

1. Method of making dough for baked food products which comprises mixing with flour, water, and other ingredients a milk powder composition which consists of from about 20 to 30 per cent of roller milk powder and from about 70 to 30 per cent of spray milk powder.

2. In the method of making dough for baked food products the step which consists in bringing into admixture with the flour and other dough ingredients from about 20 to 30 per cent of roller milk powder and from about 70 to 80 per cent of spray milk powder.

3. In the method of making dough for baked food products the step which consists in bringing into admixture with the flour and other dough ingredients about 25 per cent of roller milk powder and about 75 per cent of spray milk powder.

4. A baking product consisting of a milk powder composition for making dough for baked food products which comprises a blend of from about 20 to 30% of roller milk powder and from about 70 to 80% of spray milk powder, said blend characterized by the property of forming with other usual ingredients a dough of greater moisture absorptive power than a dough formed with either of its component parts taken singly.

5. A baking product consisting of a milk powder composition for making dough for baked food products which comprises a blend of about 25 per cent of roller milk powder and about 75 per cent of spray milk powder, said blend characterized by the property of forming with other usual ingredients a dough of greater moisture absorptive power than a dough formed with either of its component parts taken singly.

RAYMOND POWERS.